United States Patent
Yada et al.

(10) Patent No.: US 11,945,545 B2
(45) Date of Patent: Apr. 2, 2024

(54) DRIVE DISKS

(71) Applicant: HONDA MOTOR CO., LTD., Tokyo (JP)

(72) Inventors: Wataru Yada, Saitama (JP); Ritsuya Oshima, Saitama (JP); Hiroshi Gomi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 566 days.

(21) Appl. No.: 17/333,164

(22) Filed: May 28, 2021

(65) Prior Publication Data
US 2021/0380199 A1 Dec. 9, 2021

(30) Foreign Application Priority Data
Jun. 5, 2020 (JP) .................................. 2020-098234

(51) Int. Cl.
*B62M 13/00* (2010.01)
*B62K 1/00* (2006.01)

(52) U.S. Cl.
CPC ............... *B62M 13/00* (2013.01); *B62K 1/00* (2013.01)

(58) Field of Classification Search
CPC .................................. B62M 13/00; B62K 1/00
See application file for complete search history.

(56) References Cited

U.S. PATENT DOCUMENTS

| | | | | |
|---|---|---|---|---|
| 8,443,920 | B2 * | 5/2013 | Gomi | B62J 25/04 180/21 |
| 8,708,068 | B2 * | 4/2014 | Yada | B62D 61/00 180/7.1 |
| 9,415,630 | B2 * | 8/2016 | Yoshino | B62K 11/007 |
| 9,731,547 | B2 * | 8/2017 | Yoshino | B60B 27/0005 |
| 9,809,277 | B2 * | 11/2017 | Yoshino | B60B 19/003 |
| 9,919,557 | B2 * | 3/2018 | Yoshino | B62K 11/007 |
| 10,179,627 | B2 * | 1/2019 | Yada | B62H 1/12 |
| 2010/0096905 | A1 * | 4/2010 | Takenaka | B62K 1/00 301/5.1 |

FOREIGN PATENT DOCUMENTS

JP 2011063214 A 3/2011

* cited by examiner

*Primary Examiner* — Kevin Hurley
*Assistant Examiner* — Michael R Stabley
(74) *Attorney, Agent, or Firm* — Armstrong Teasdale LLP

(57) ABSTRACT

Drive disks are configured to rotate a main wheel by applying a frictional force thereto. Each of the drive disks includes a base and a plurality of rollers. The base includes a first sheet metal member and a second sheet metal member. The first sheet metal member includes a first central part and a plurality of first arm parts. The second sheet metal member includes a second central part and a plurality of second arm parts. Each of the rollers has a first end and a second end in an axial direction thereof. Each of the first arm parts and each of the second arm parts support the first end of one of two rollers adjacent to each other and the second end of the other of the two rollers adjacent to each other.

9 Claims, 16 Drawing Sheets

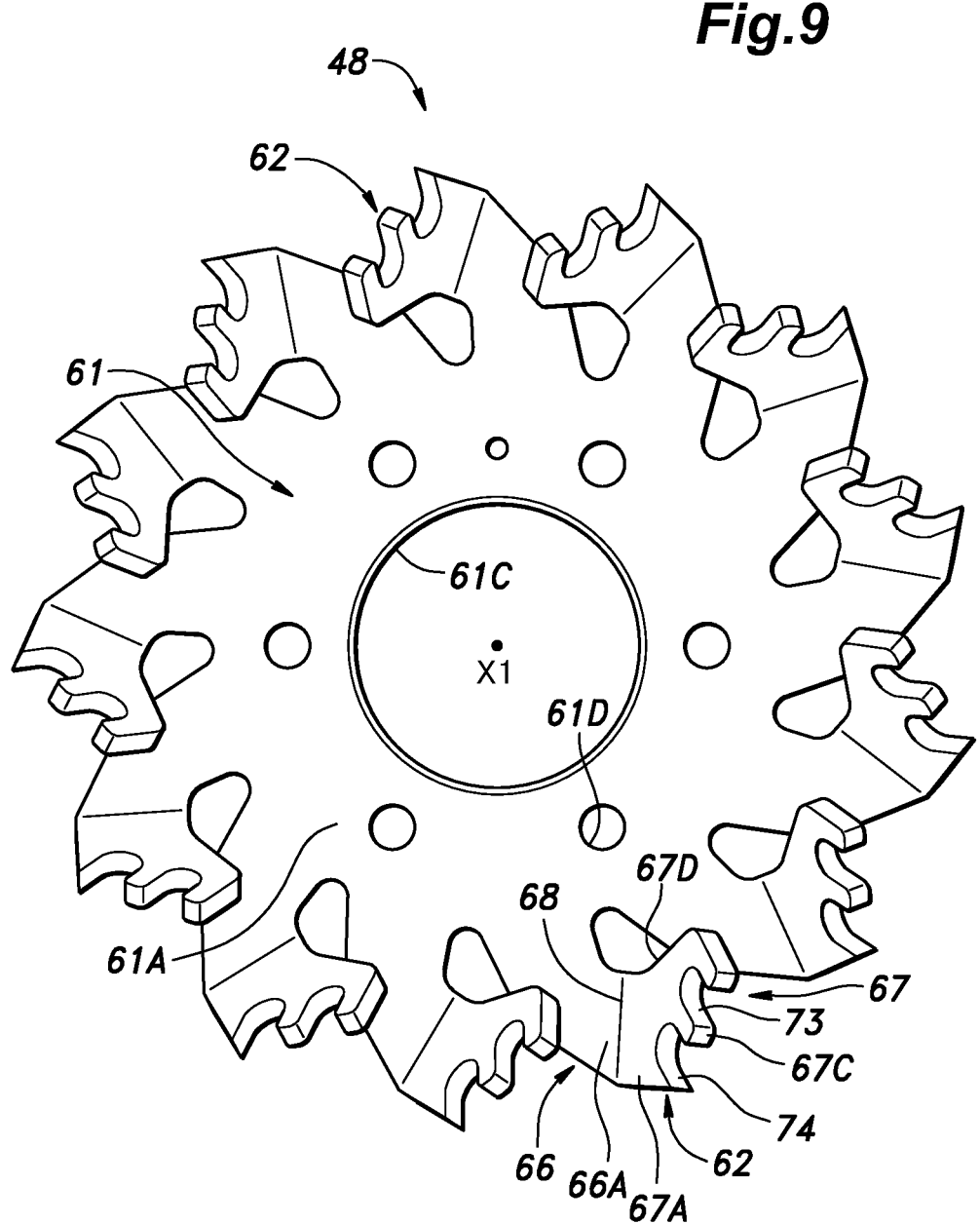

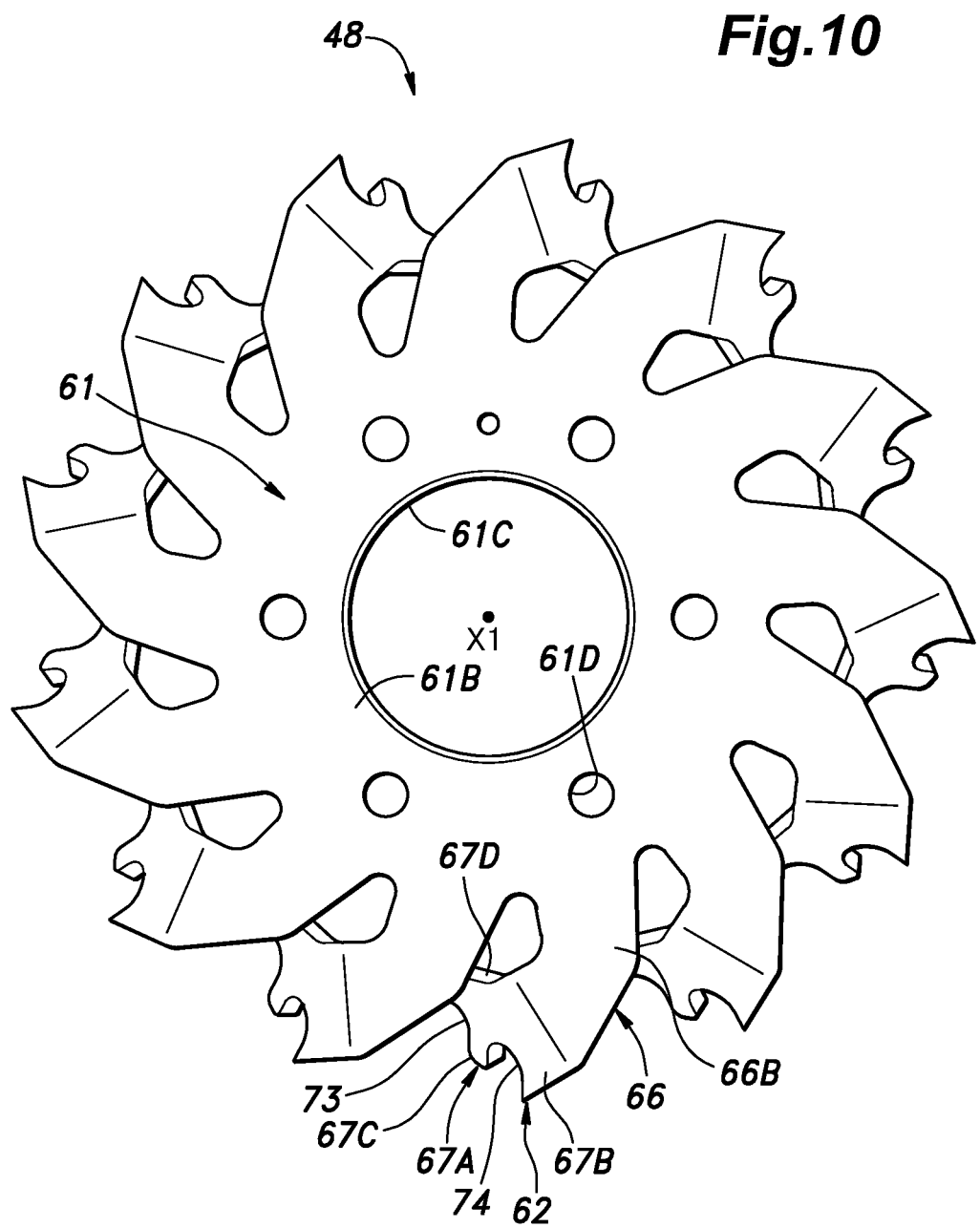

DRIVE DISKS

TECHNICAL FIELD

The present invention relates to drive disks used for a frictional drive unit.

BACKGROUND ART

There is a known frictional drive unit used as a drive device for an inverted pendulum vehicle (for example, JP2011-63214A). The frictional drive unit includes a frame, a pair of drive disks rotatably supported by the frame, an annular main wheel arranged between the pair of drive disks, and a pair of actuators configured to independently drive each drive disk. The drive disk has a disk-shaped base that is rotatable with respect to the frame and a plurality of drive rollers rotatably supported by an outer circumferential part of the base so as to come into contact with the main wheel. The drive rollers are arranged in rotationally symmetrical positions around a rotational axis of the base. The main wheel can rotate around a central axis and an annular axis. The frictional drive unit controls the rotation of the main wheel around the central axis and the annular axis by controlling the rotational direction and the rotational amount of the pair of drive disks, thereby moving the inverted pendulum vehicle in all directions, including the front direction, the rear direction, the left direction, and the right direction.

Each drive disk according to JP2011-63214A has slots for receiving the drive rollers, bearing holes formed in a side wall defining each slot, and roller axes inserted into each bearing hole along its axial direction to rotatably support each drive roller.

Each drive disk according to JP2011-63214A has bearing walls which enables the base to rotatably support the drive rollers and the slots formed between the bearing walls. Since the bearing walls and slots are arranged in different directions, it is difficult to form these elements and the cost is increased accordingly. There is a probable manufacturing method in which the bearing walls are prepared as separate members and then assembled to the base. However, such a manufacturing method may increase the number of operations because a large number of bearing walls should be assembled to the base.

SUMMARY OF THE INVENTION

In view of such a problem of the prior art, a primary object of the present invention is to provide drive disks that can be manufactured easily.

To achieve such an object, one aspect of the present invention provides drive disks (4) arranged on either side of an annular main wheel (5) and configured to rotate the main wheel around a central axis and an annular axis by applying a frictional force to the main wheel, each of the drive disks including: a disk-shaped base (20) rotatably supported by a frame (3); and a plurality of rollers (21) rotatably supported by an outer circumferential part of the base, inclined to each other, and coming into contact with the main wheel, wherein the base includes a first sheet metal member (47) and a second sheet metal member (48), the first sheet metal member includes a first central part (51) and a plurality of first arm parts (52) extending radially outward from the first central part, the second sheet metal member includes a second central part (61) and a plurality of second arm parts (62) extending radially outward from the second central part, the first central part and the second central part are arranged coaxially with each other, each of the rollers has a first end (43A) and a second end (43B) in an axial direction thereof, each of the first arm parts and each of the second arm parts support the first end of one of two rollers adjacent to each other and the second end of the other of the two rollers adjacent to each other.

According to this aspect, the base that rotatably supports the rollers can be formed by two sheet metal members, so that the drive disks can be manufactured easily.

In the above aspect, preferably, in a circumferential direction of the base, a tip end (67) of each of the second arm parts is arranged between tip ends (54) of two first arm parts adjacent to each other.

According to this aspect, in the circumferential direction of the base, the first arm parts and the second arm parts are arranged alternately. Further, the rollers can be arranged in the respective spaces between the first arm parts and the second arm parts.

In the above aspect, preferably, the tip end of each of the first arm parts and the tip end of each of the second arm parts are arranged on one virtual plane perpendicular to a rotational axis of the base.

According to this aspect, in the circumferential direction of the base, the first arm parts and the second arm parts are arranged alternately.

In the above aspect, preferably, the tip end of each of the first arm parts extends outward in a radial direction of the base, and the tip end of each of the second arm parts extends inward in the radial direction of the base.

According to this aspect, the first arm parts and the second arm parts can be arranged alternately in the circumferential direction of the base without interfering with each other.

In the above aspect, preferably, each of the first arm parts includes a first supporting part (71) and a second supporting part (72) arranged inside of the first supporting part in a radial direction of the base, each of the second arm parts includes a third supporting part (73) and a fourth supporting part (74) arranged outside of the third supporting part in the radial direction of the base, the first end of the one of the two rollers adjacent to each other is supported by the first supporting part and the second end thereof is supported by the third supporting part, and the first end of the other of the two rollers adjacent to each other is supported by the fourth supporting part and the second end thereof is supported by the second supporting part.

According to this aspect, the rollers can be arranged in the respective spaces between the first arm parts and the second arm parts. Further, the rollers can be arranged in rotationally symmetrical positions around the axis of each drive disk.

In the above aspect, preferably, the first end or the second end of each of the rollers is supported by at least one of the first to fourth supporting parts via a bushing for changing an angle of each of the rollers with respect to each of the first arm parts or each of the second arm parts.

According to this aspect, the first supporting part and the second supporting part of each first arm part can be arranged on the same plane. Namely, it is not necessary to incline the first supporting part and the second supporting part to each other. Similarly, the third supporting part and the fourth supporting part of each second arm part can be arranged on the same plane. Accordingly, it is not necessary to incline the third supporting part and the fourth supporting part to each other.

In the above aspect, preferably, the bushing has an outer circumferential surface (77A) coming into contact with the at least one of the first to fourth supporting parts and an inner circumferential surface (79) coming into contact with the first end or the second end of each of the rollers, and an axis of the outer circumferential surface and an axis of the inner circumferential surface are inclined to each other. Further, the bushing may include a first part received by the at least one of the first to fourth supporting parts, a second part provided at an end of the first part and having a larger width than the first part, and an inner hole penetrating through the first part and the second part. The second part may have an end surface on a side of the first part, and the end surface may come into surface contact with the first arm part or the second arm part. A straight line perpendicular to the end surface of the second part and an axis of the inner hole may be inclined to each other.

According to this aspect, the configuration of the bushing can be simplified.

In the above aspect, preferably, a distance to the outer circumferential surface from a center thereof varies in a circumferential direction, and the outer circumferential surface is supported by the at least one of the first to fourth supporting parts such that the outer circumferential surface is not rotatable.

According to this aspect, the rotation of the bushing with respect to the first arm part or the second arm part can be suppressed, so that the rotational axis of the roller can be maintained in a constant direction.

In the above aspect, preferably, at least one of the first supporting part and the third supporting part is a groove opening toward a side of the main wheel, and at least one of the second supporting part and the fourth supporting part is a groove opening toward a side of the main wheel.

According to this aspect, the roller can be attached to the first arm part or the second arm part by inserting the first end or the second end of the roller into the groove. Accordingly, the attachment operation of the roller can be facilitated.

Thus, according to the above aspects, it is possible to provide drive disks that can be manufactured easily.

BRIEF DESCRIPTION OF THE DRAWING(S)

FIG. 9 is a side view of the second sheet metal member viewed from a side of a first surface of a second central part;

FIG. 10 is a side view of the second sheet metal member viewed from a side of a second surface of the second central part;

DESCRIPTION OF THE PREFERRED EMBODIMENT(S)

In the following, an embodiment of drive disks according to the present invention will be described with reference to the drawings. The drive disks are used for a frictional drive unit. The frictional drive unit is used for an inverted pendulum vehicle, for example.

Figure 1:
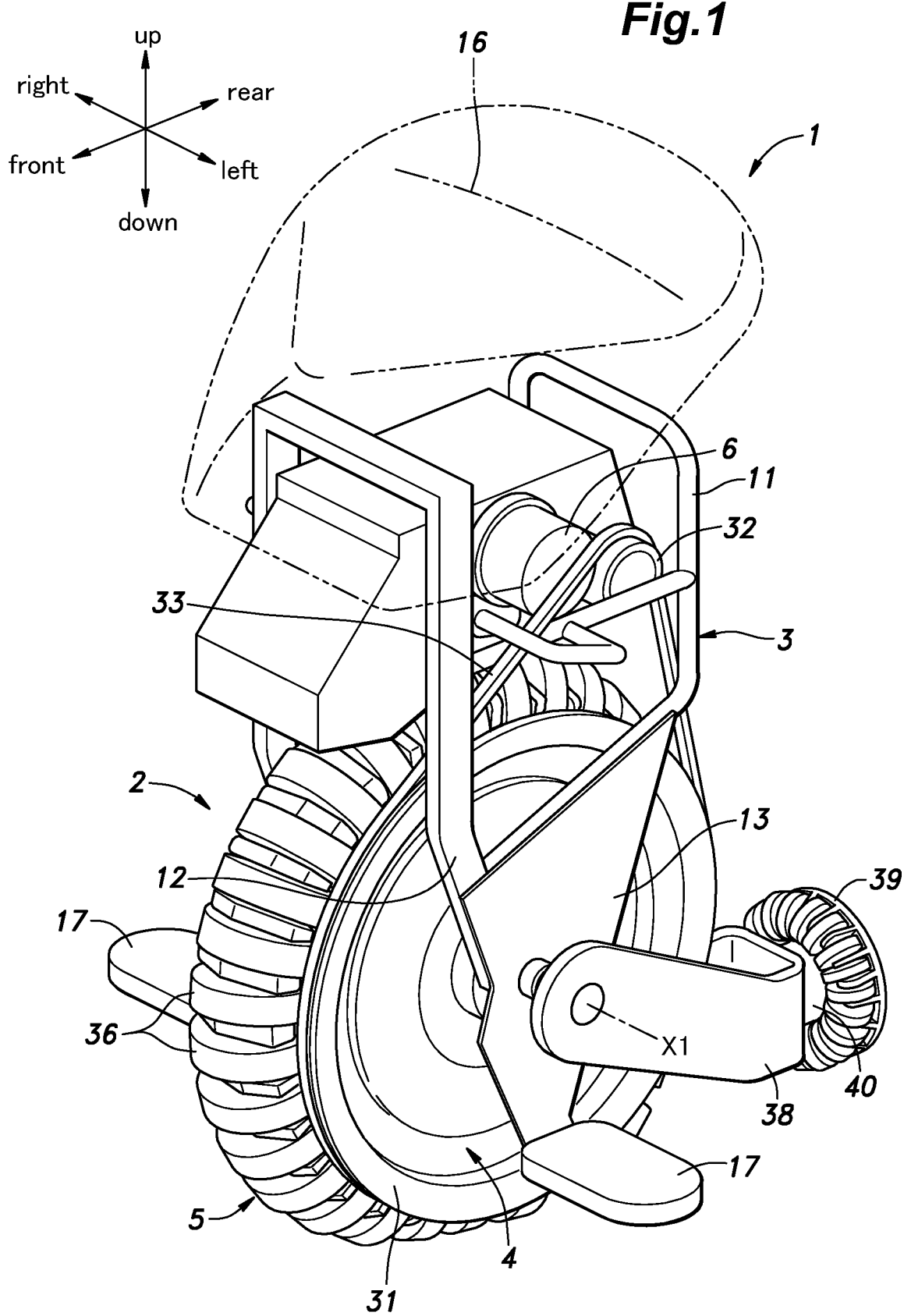
FIG. 1 is a perspective view of an inverted pendulum vehicle including drive disks according to an embodiment.
Figure 2:
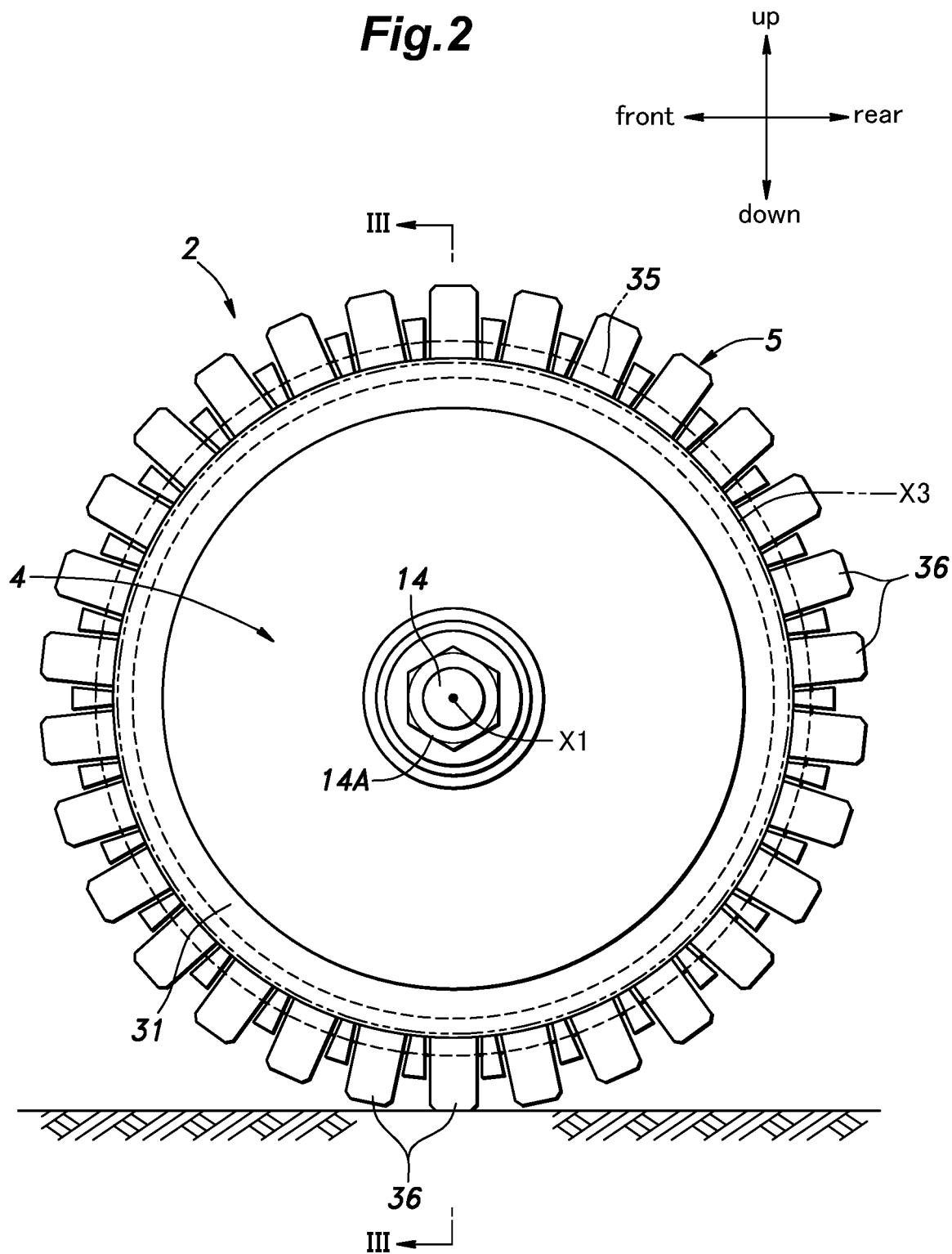
FIG. 2 is a side view of a frictional drive unit.
Figure 3:
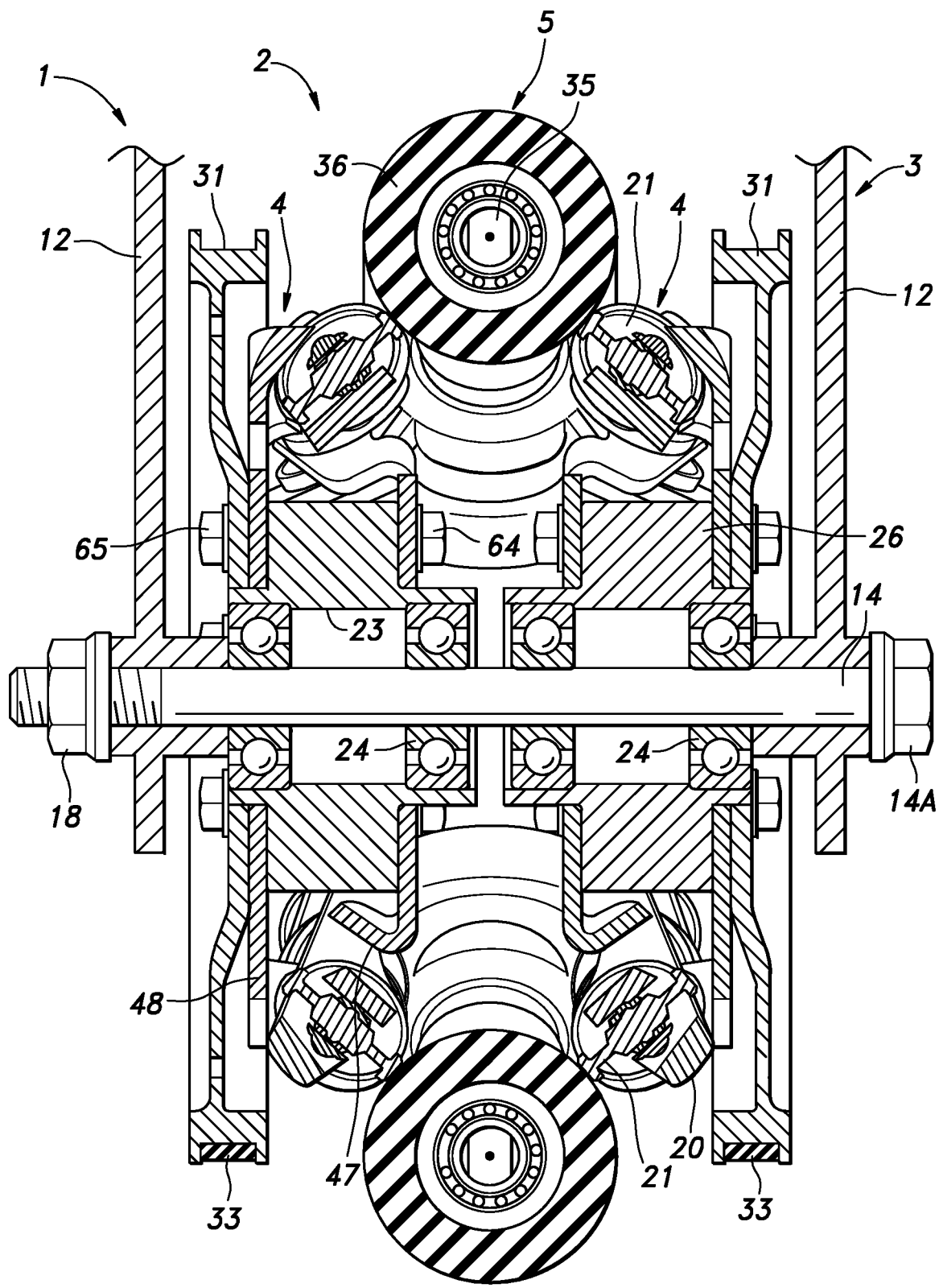
FIG. 3 is a sectional view taken along a line of FIG. 2.

As shown in FIGS. 1 to 3, an inverted pendulum vehicle 1 includes a frictional drive unit 2. The frictional drive unit 2 includes a frame 3, a pair of drive disks 4 (left and right drive disks 4) rotatably supported by the frame 3, an annular main wheel 5 arranged between the pair of drive disks 4, and a pair of actuators 6 configured to independently rotate the pair of drive disks 4.

As shown in FIG. 1, the frame 3 includes an upper frame 11 formed in a substantial parallelepiped, left and right lower frames 12 extending downward from left and right lower ends of the upper frame 11, left and right lower plates 13 respectively connected to the lower frames 12, and a supporting shaft 14 (see FIG. 3) extending between the left and right lower frames 12. A saddle 16 to support the buttocks of the occupant is attached to an upper part of the upper frame 11. Left and right footrests 17 to support the soles of the occupant are attached to lower ends of the lower plates 13.

As shown in FIG. 3, the supporting shaft 14 extends in the lateral direction, and is connected to the left and right lower frames 12. A left end of the supporting shaft 14 passes through the left lower frame 12, and a right end of the supporting shaft 14 passes through the right lower frame 12. The supporting shaft 14 is provided with a bolt head 14A at a base end thereof, and comes into contact with one lower frame 12 at the bolt head 14A. A nut 18 is attached to a tip end of the supporting shaft 14 so as to fix the supporting shaft 14 to the other lower frame 12.

The drive disks 4 are respectively arranged on either side of the annular main wheel 5, and configured to rotate the main wheel 5 around a central axis and to rotate the main wheel 5 (more specifically, an outer circumferential part of the main wheel 5) around annular axis by applying a frictional force to the main wheel 5. Each drive disk 4 includes a disk-shaped base 20 rotatably supported by the frame 3 and a plurality of drive rollers 21 (the rollers) rotatably supported by an outer circumferential part of the base 20, inclined to each other, and coming into contact with the main wheel 5.

In the present embodiment, the left and right drive disks 4 are rotatably supported by the supporting shaft 14, and are arranged between the left and right lower frames 12. Each of the left and right drive disks 4 is formed in a disk shape, and has a bearing hole 23 (through hole) in the center thereof. The supporting shaft 14 passes through the bearing hole 23 of each of the left and right drive disks 4. The left and right drive disks 4 are supported by the supporting shaft 14 so as to rotate around an axis X1 (central axis). A bearing 24 such as a ball bearing is attached to the bearing hole 23, and each of the left and right drive disks 4 is supported by the supporting shaft 14 via the bearing 24.

Each of the left and right drive disks 4 has an opposite surface. The opposite surface of the left drive disk 4 is opposite to the opposite surface of the right drive disk 4. A driven pulley 31 is provided on the opposite surface of each of the left and right drive disks 4. The driven pulley 31 is provided coaxially with each of the left and right drive disks 4. As shown in FIG. 1, the upper frame 11 is provided with a right actuator 6 to drive the right drive disk 4 and a left actuator 6 to drive the left drive disk 4. Each actuator 6 consists of, for example, an electric motor. A drive pulley 32 is provided on an output shaft of each actuator 6. The drive pulley 32 and the driven pulley 31, which correspond to each other in the lateral direction, are connected by a belt 33. The left and right actuators 6 can rotate independently of each other, thereby rotating the left and right drive disks 4 independently.

As shown in FIGS. 1 to 3, the main wheel 5 has an annular shape, and is arranged between the pair of drive disks 4 so as to be coaxial therewith. The main wheel 5 comes into contact with the plurality of drive rollers 21, and can rotate around the central axis and the annular axis. In the present embodiment, the main wheel 5 includes an annular core member 35 and a plurality of driven rollers 36 rotatably supported by the core member 35. The plurality of driven rollers 36 are arranged at equal intervals in the circumferential direction of the core member 35. Each driven roller 36 is rotatably supported by the core member 35 around the axis X3 (annular axis) of the annular core member 35. More specifically, each driven roller 36 can rotate around the tangent of the core member 35 at the respective position with respect to the core member 35. Upon receiving an external force, each driven roller 36 rotates with respect to the core member 35.

The main wheel 5 is arranged along the outer circumferential parts of the left and right drive disks 4, and comes into contact with the plurality of drive rollers 21 of the left and right drive disks 4. The drive rollers 21 of the left and right drive disks 4 come into contact with an inner circumferential part of the main wheel 5, and hold the main wheel 5 from either lateral side thereof. Further, the drive rollers 21 of the left and right drive disks 4 come into contact with the inner circumferential part of the main wheel 5, thereby suppressing the displacement of the drive disks 4 in the radial direction around the axis X1. Accordingly, the main wheel 5 is supported by the left and right drive disks 4, and the central axis of the main wheel 5 (the core member 35) is arranged coaxially with the axis X1 of the left and right drive disks 4. The plurality of driven rollers 36 of the main wheel 5 come into contact with the plurality of drive rollers 21 of the left and right drive disks 4.

As shown in FIG. 1, left and right front ends of a tail wheel arm 38 are supported by the left and right lower plates 13 such that the tail wheel arm 38 can rotate around a rotational axis extending in the lateral direction. The rotational axis of the tail wheel arm 38 may coincide with the axis X1 of the drive disks 4. The tail wheel arm 38 extends rearward from a front end thereof, which is bifurcated. A tail wheel 39 is provided at a rear end of the tail wheel arm 38. The tail wheel 39 is, for example, an omni-wheel, and is supported by a rear end of the tail wheel arm 38 so as to rotate around an axis extending in the front-and-rear direction. The tail wheel 39 is rotated by a tail wheel motor 40, which is an electric motor provided at the rear end of the tail wheel arm 38.

In a case where the left and right drive disks 4 rotate in the same direction at the same rotational speed, the main wheel 5 rotates together with the left and right drive disks 4. Namely, the main wheel 5 rotates around its own rotational axis, which coincides with the axis X1, and the inverted pendulum vehicle 1 moves forward or backward. At this time, the drive rollers 21 of the drive disks 4 and the driven rollers 36 of the main wheel 5 do not rotate with respect to the core member 35.

In a case where there is a difference in rotational speeds of the left and right drive disks 4, a component force is applied from the drive rollers 21 of the left and right drive disks 4 to the driven rollers 36 of the main wheel 5. The component force is a force in a direction perpendicular to a force in the circumferential direction (tangential direction) caused by the rotation of the left and right drive disks 4. The axis of each drive roller 21 is inclined to the circumferential direction of the drive roller 21 (the left and right drive disks 4), and thus the component force is generated due to the difference in the rotational speeds of the left and right drive disks 4. Owing to this component force, the drive rollers 21 rotate with respect to the base 20 and the driven rollers 36 rotate with respect to the core member 35. Accordingly, the main wheel 5 generates a driving force in the direction along the rotational axis, namely, in the lateral direction of the inverted pendulum vehicle 1. Thus, the inverted pendulum vehicle 1 rotates to the left or right around the tail wheel 39.

In the following, one of the pair of drive disks 4 (hereinafter simply referred to as "drive disk 4") will be described in detail with reference to FIGS. 4 to 14. With regard to two directions along the axis X1 of the drive disk 4, one direction toward a side of the main wheel 5 is defined as "the first direction", and the other direction opposite to the first direction is defined as "the second direction".

Figure 12:
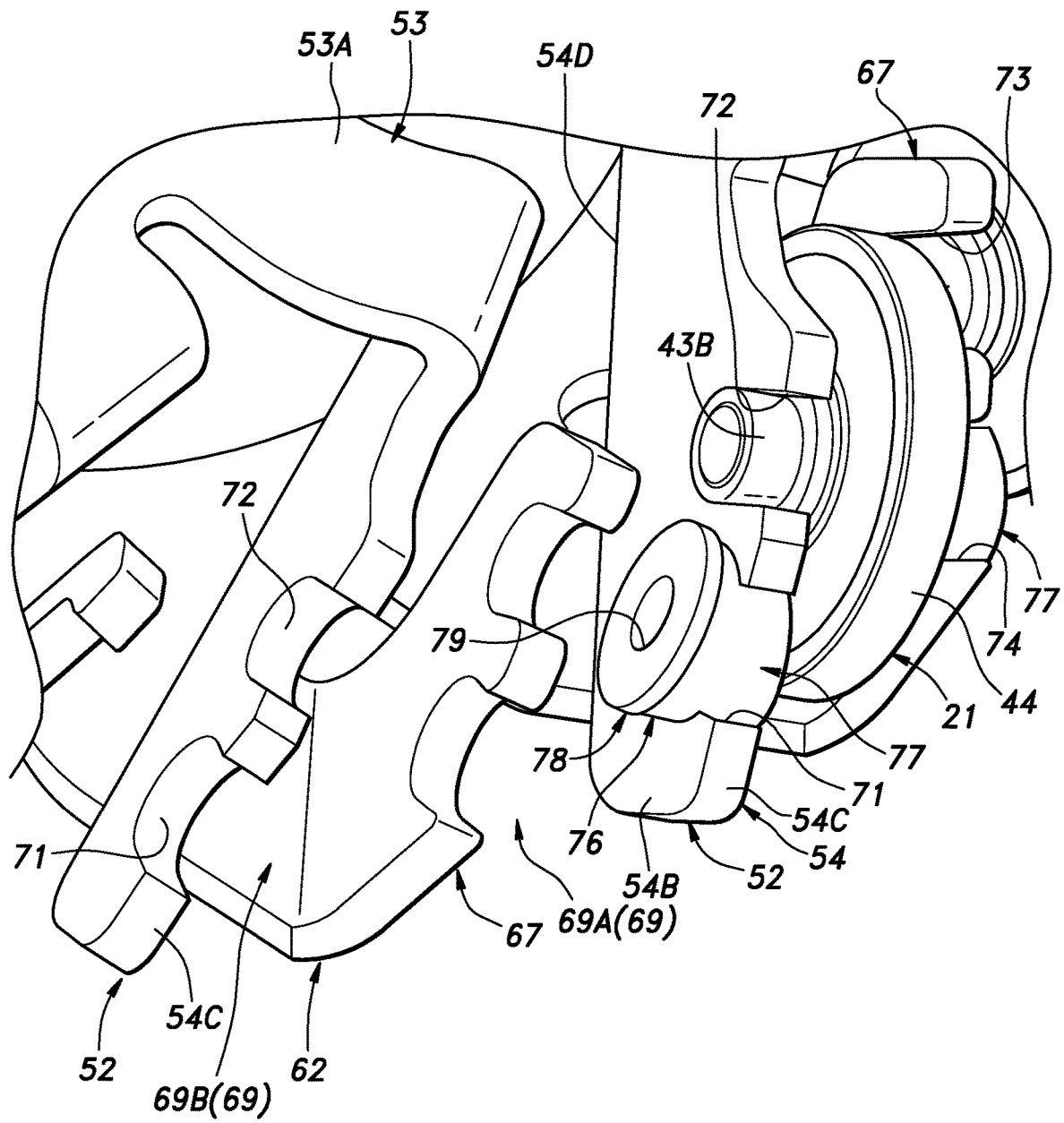
FIG. 12 is an exploded perspective view showing roller receiving parts of the drive disk.
Figure 13:
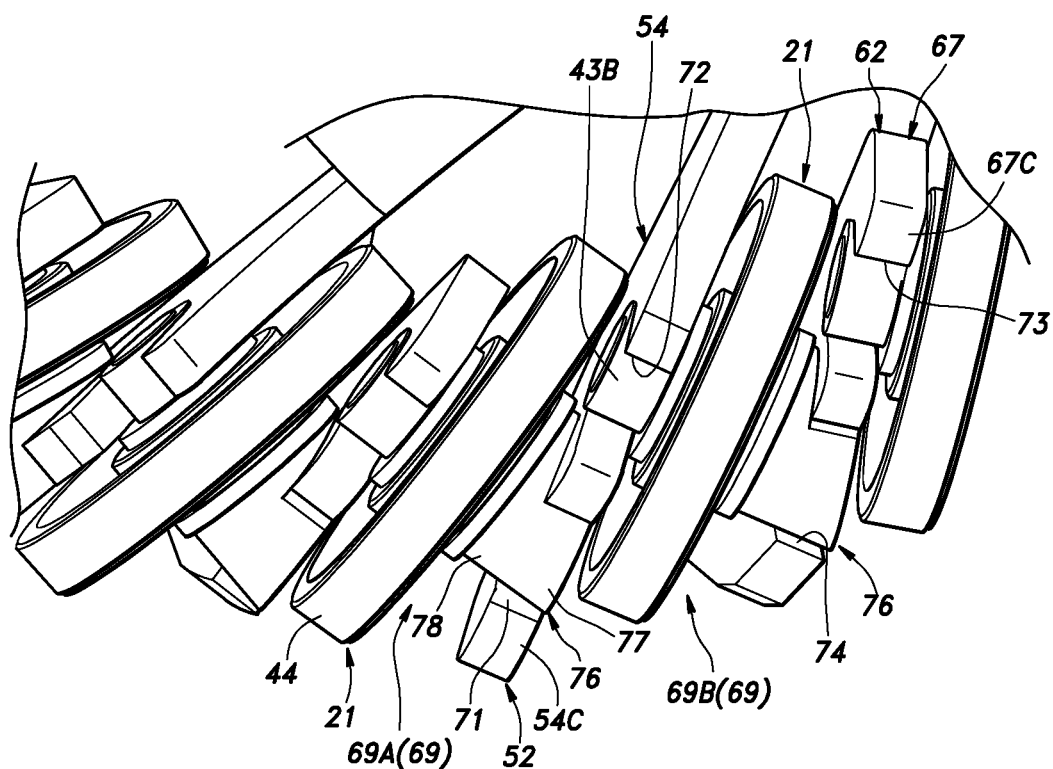
FIG. 13 is a perspective view showing the roller receiving parts of the drive disk.
Figure 14:
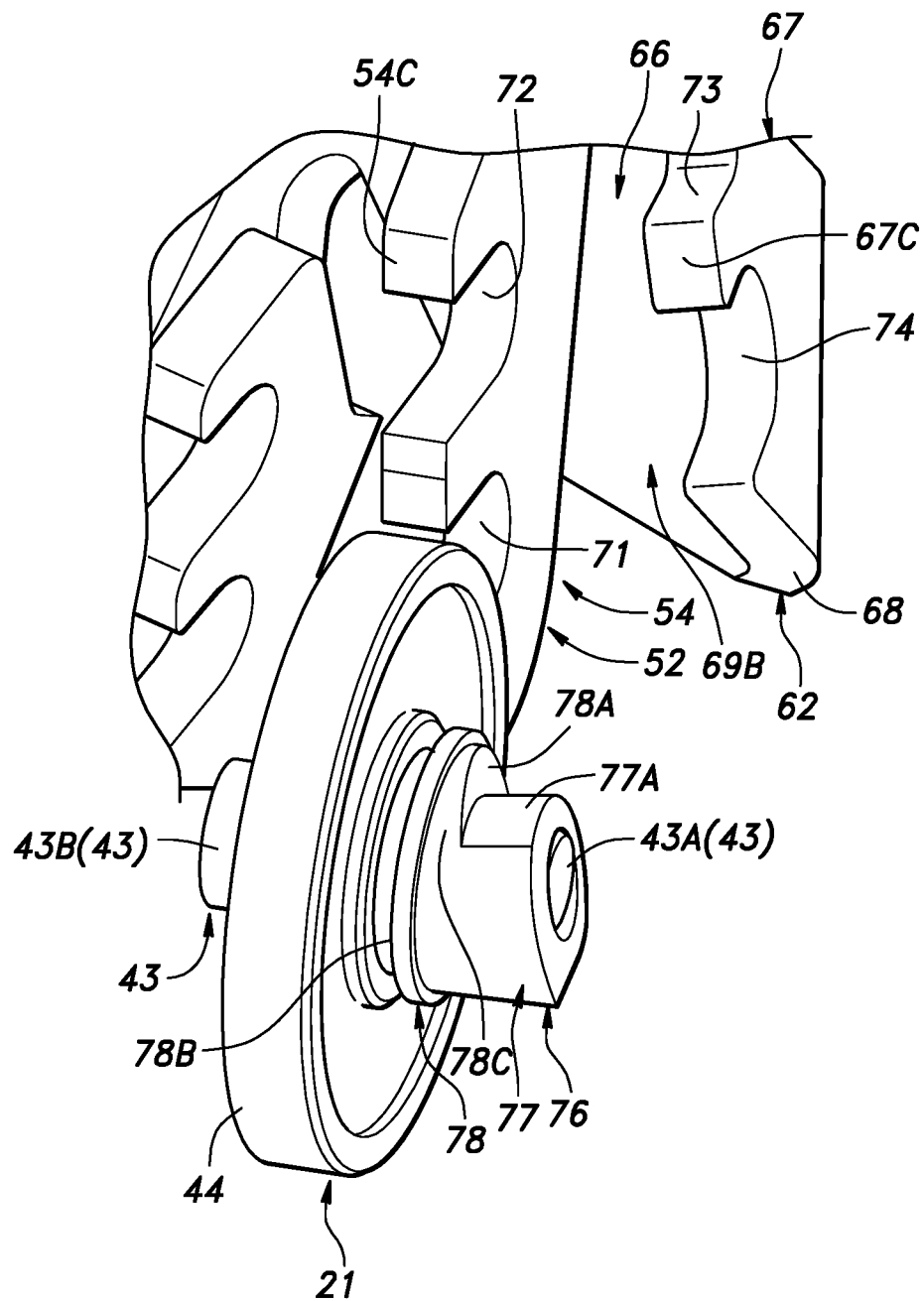
FIG. 14 is an exploded perspective view showing the roller receiving parts of the drive disk.

As shown in FIGS. 12-14, each drive roller 21 includes a shaft 43 and a roller body 44. The roller body 44 is provided in the center of the shaft 43, and has a larger diameter than the shaft 43. The roller body 44 may be formed integrally with the shaft 43, or may be rotatably supported by the shaft 43. With regard to the drive disk 4, the drive rollers 21 are arranged in rotationally symmetrical positions around the axis X1 of the drive disk 4. The drive rollers 21 are arranged in the outer circumferential part of the drive disk 4 at equal intervals in the circumferential direction thereof. The shaft 43 of each drive roller 21 is inclined to the circumferential direction (tangential direction) of the drive disk 4, and is also inclined to a plane perpendicular to the axis X1 of the drive disk 4. A part of each drive roller 21 protrudes in the first direction with respect to the base 20. An end of the shaft 43 arranged on one side in the circumferential direction of the drive disk 4 is defined as a first end 43A, and an end of the shaft 43 on the side opposite to the one side in the circumferential direction thereof is defined as a second end 43B.

Figure 4:
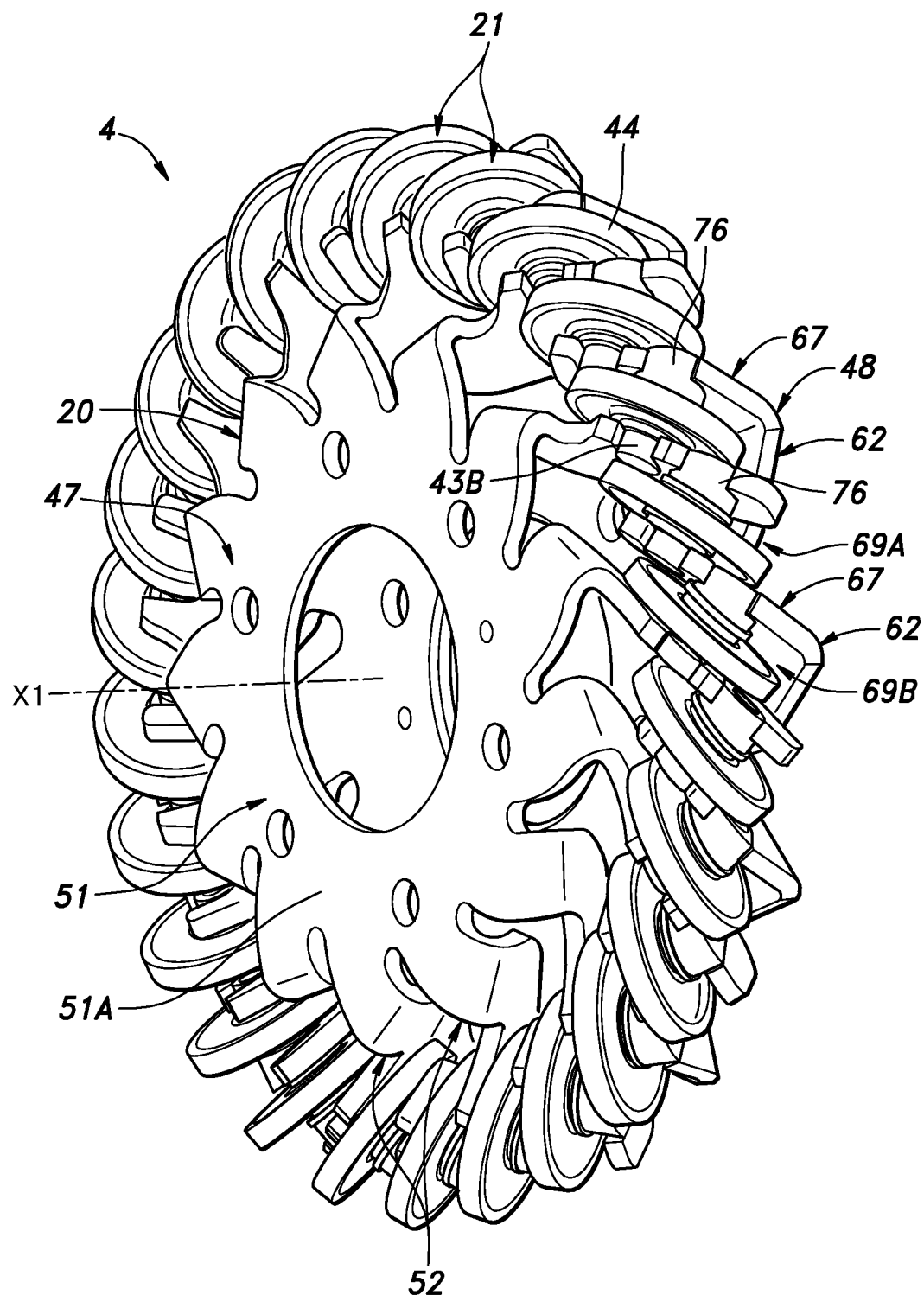
FIG. 4 is a perspective view of the drive disk including drive rollers.

As shown in FIG. 4, the base 20 of the drive disk 4 includes a first sheet metal member 47 and a second sheet metal member 48. Each of the first sheet metal member 47 and the second sheet metal member 48 is formed by cutting, drilling, and bending one flat sheet metal. Each of the first sheet metal member 47 and the second sheet metal member 48 may be made of alloy steel such as stainless steel, carbon steel, or nonferrous material such as aluminum.

Figure 5:
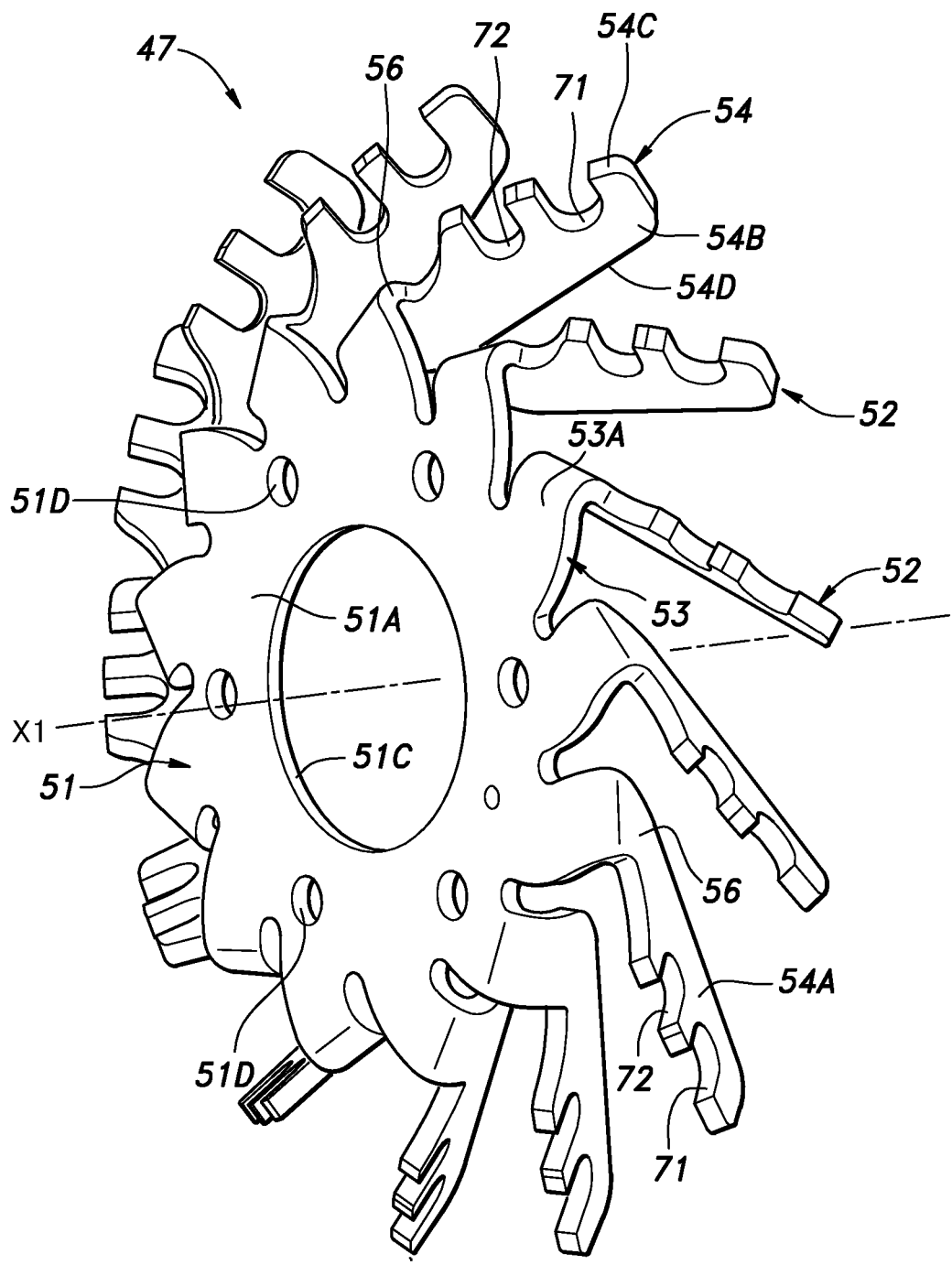
FIG. 5 is a perspective view of a first sheet metal member.
Figure 6:
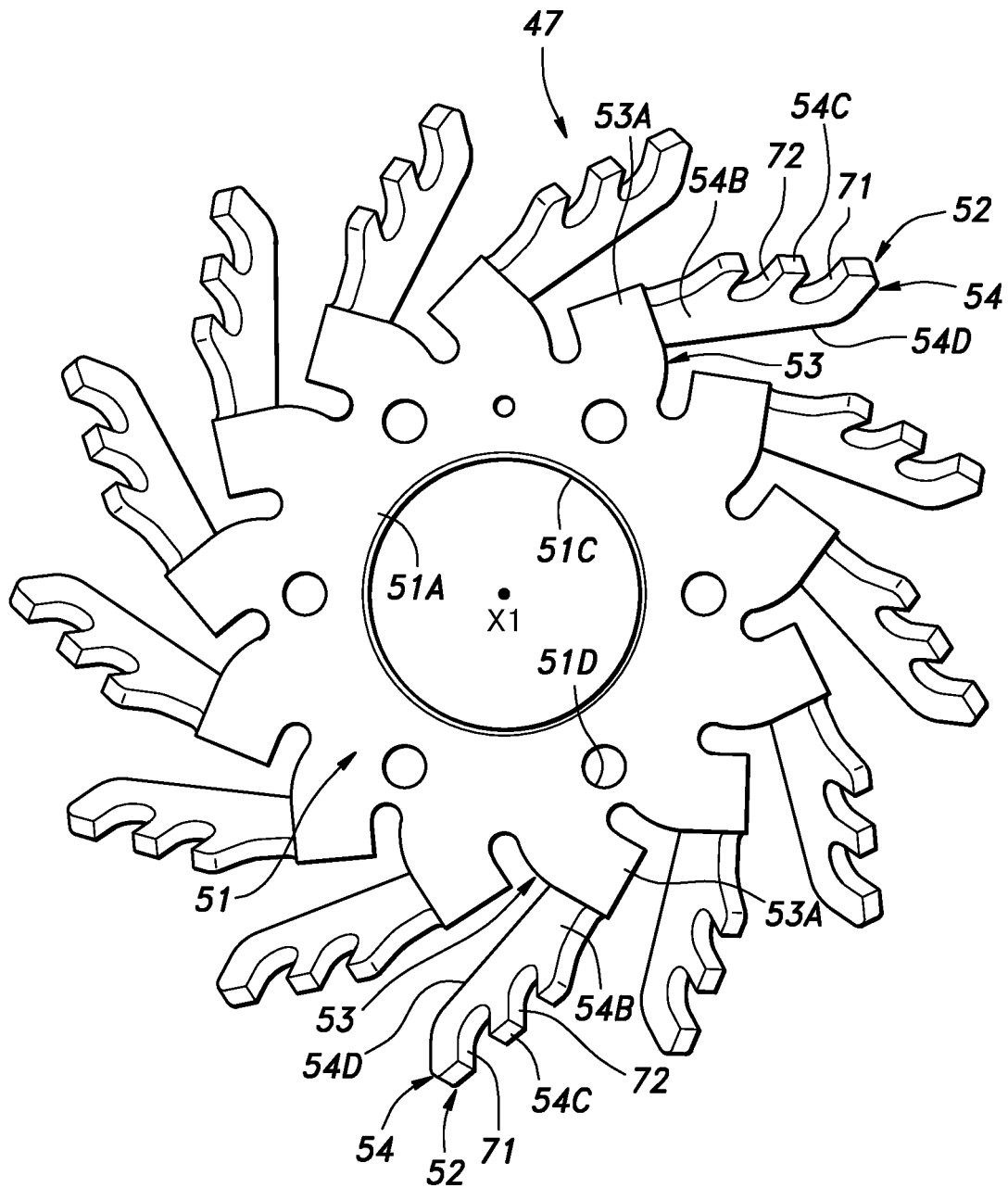
FIG. 6 is a side view of the first sheet metal member viewed from a side of a first surface of a first central part.
Figure 7:
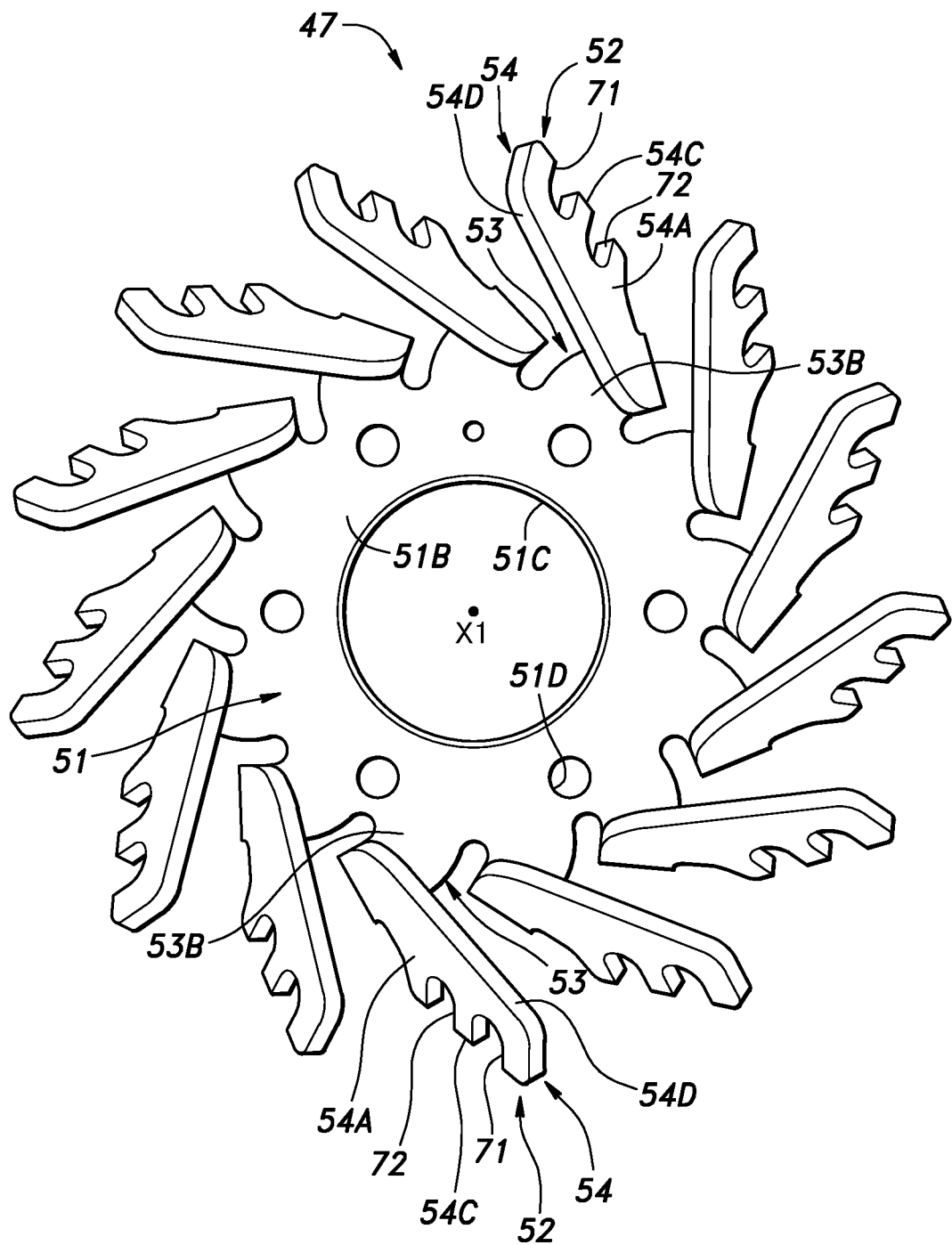
FIG. 7 is a side view of the first sheet metal member viewed from a side of a second surface of the first central part.

As shown in FIGS. 5 to 7, the first sheet metal member 47 includes a first central part 51 and a plurality of first arm parts 52 extending radially outward from the first central part 51. The first central part 51 is formed in a disk shape. The first central part 51 has a first surface 51A facing toward the first direction and a second surface 51B facing toward the second direction. The axis of the first central part 51 coincides with the axis X1 of the drive disk 4 and the axis of the base 20.

A circular first hole 51C, which penetrates from the first surface 51A to the second surface 51B, is formed in the center of the first central part 51. Further, the first central part 51 is provided with a plurality of first bolt holes 51D around the first hole 51C. The first hole 51C is arranged coaxially with the axis X1 of the drive disk 4.

The plurality of first arm parts 52 are formed to be rotationally symmetrical with each other around the axis X1 of the drive disk 4. The plurality of first arm parts 52 are arranged at equal intervals around the axis X1 of the drive disk 4. Each first arm part 52 includes a first arm base end 53 extending radially outward from the first central part 51 and a first arm tip end 54 extending from a tip end of the first arm base end 53. The first arm tip end 54 extends in a direction different from a direction in which the first arm base end 53 extends.

The first arm base end 53 is arranged on the same plane as the first central part 51. The extending direction of the first arm base end 53 may make a prescribed angle with the radial direction of the first central part 51 (namely, the extending direction of the first arm base end 53 may be inclined to the radial direction of the first central part 51) when viewed in the direction along the axis X1 of the drive disk 4. The first arm base end 53 is formed in a flat plate shape. The first arm base end 53 includes a first surface 53A arranged on the same plane as the first surface 51A of the first central part 51 and a second surface 53B arranged on the same plane as the second surface 51B of the first central part 51.

A bent part 56 which extends linearly is formed at the boundary between the first arm tip end 54 and the first arm base end 53. At the bent part 56, the first arm tip end 54 is bent from the first arm base end 53 in the second direction such that an acute angle is formed between the first arm base end 53 and the first arm tip end 54.

The first arm tip end 54 extends outward in the radial direction of the drive disk 4 from a tip end of the first arm base end 53. Further, when viewed in the direction along the axis X1 of the drive disk 4, the first arm tip end 54 extends so as to be inclined to the first arm base end 53. When viewed in the direction along the axis X1 of the drive disk 4, the first arm tip end 54 extends substantially perpendicularly to the first arm base end 53, for example. Further, when viewed from the side of the first surface 51A of the first central part 51, the first arm tip end 54 extends from the first arm base end 53 in the clockwise direction around the axis X1 of the drive disk 4.

The first arm tip end 54 is formed in a flat plate shape. A first surface 54A of the first arm tip end 54 faces toward the second direction and toward one side in the circumferential direction around the axis X1 of the drive disk 4. A second surface 54B of the first arm tip end 54 faces toward the first direction and toward the other side in the circumferential direction around the axis X1 of the drive disk 4.

The first surface 54A of the first arm tip end 54 is connected to the first surface 53A of the first arm base end 53 via a curved surface of the bent part 56. Similarly, the second surface 54B of the first arm tip end 54 is connected to the second surface 53B of the first arm base end 53 via a curved surface of the bent part 56. The first arm tip end 54 includes a first side edge 54C and a second side edge 54D, which extend in the longitudinal direction of the first arm tip end 54. The first side edge 54C is arranged on a side of the first direction with respect to the second side edge 54D.

Figure 8:
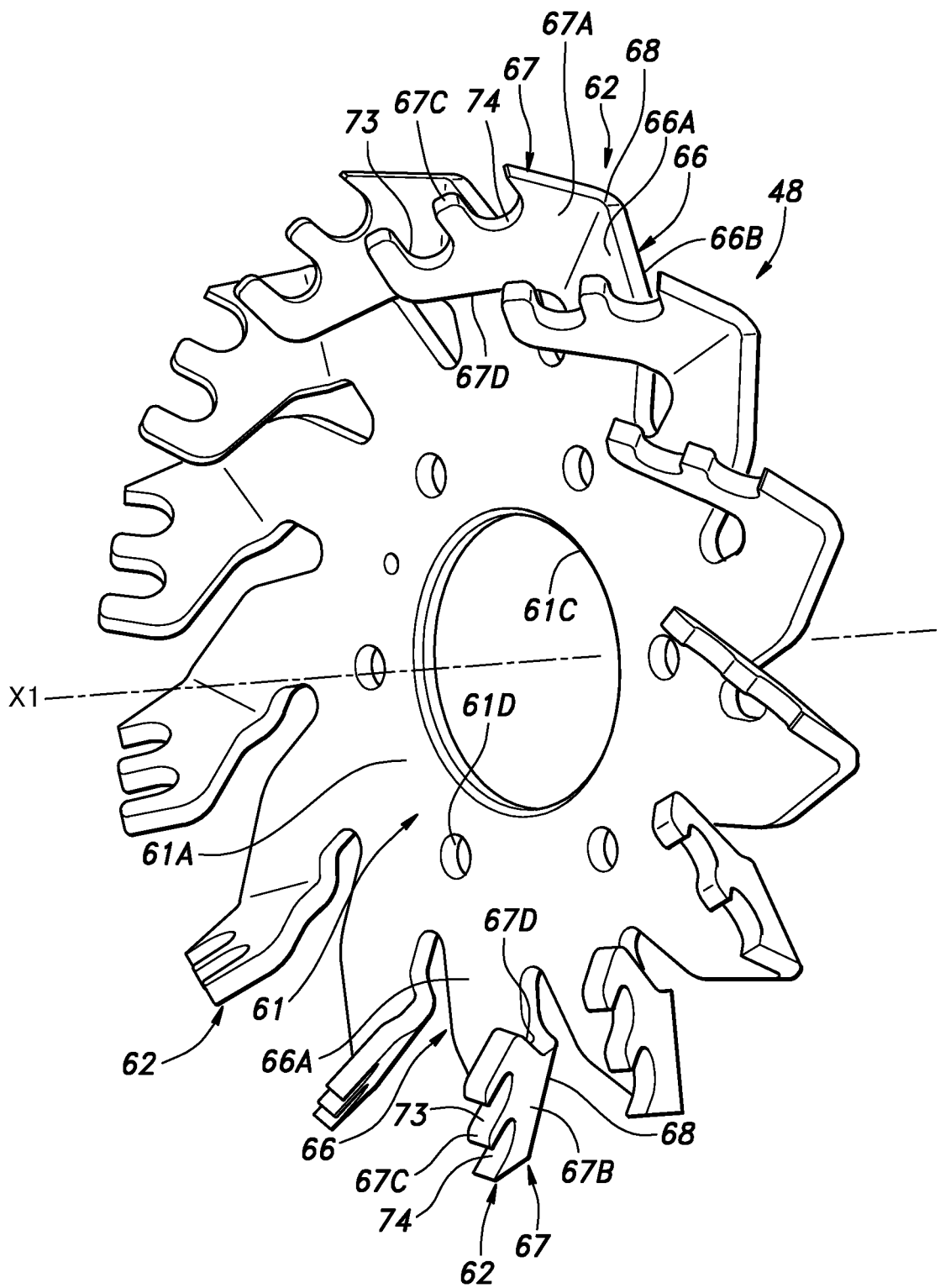
FIG. 8 is a perspective view of a second sheet metal member.

As shown in FIGS. 3 and 4, the second sheet metal member 48 is arranged on a side of the second direction with respect to the first sheet metal member 47. As shown in FIGS. 8 to 10, the second sheet metal member 48 includes a second central part 61 and a plurality of second arm parts 62 extending radially outward from the second central part 61. The second central part 61 is formed in a disk shape. The second central part 61 has a first surface 61A facing toward the first direction and a second surface 61B facing toward the second direction. The axis of the second central part 61 is arranged coaxially with the axis X1 of the drive disk 4. The first central part 51 and the second central part 61 are arranged coaxially with each other.

A circular second hole 61C, which penetrates from the first surface 61A to the second surface 61B, is formed in the center of the second central part 61. Further, the second central part 61 is provided with a plurality of second bolt holes 61D around the second hole 61C. The second hole 61C is arranged coaxially with the axis X1 of the drive disk 4.

As shown in FIG. 3, the first central part 51 and the second central part 61 are fastened by a plurality of bolts 64 and nuts 65 via a spacer 26. Each bolt 64 passes through the first bolt hole 51D, a bolt hole (not shown) formed in the spacer 26, and the second bolt hole 61D. The bearing hole 23 is arranged in the central part of the spacer 26 and formed coaxially with the axis X1 of the drive disk 4.

As shown in FIGS. 8 to 10, the plurality of second arm parts 62 are formed to be rotationally symmetrical with each other around the axis X1 of the drive disk 4. The plurality of second arm parts 62 are arranged at equal intervals around the axis X1 of the drive disk 4. Each second arm part 62 includes a second arm base end 66 extending radially outward from the second central part 61 and a second arm tip end 67 extending from a tip end of the second arm base end 66. The second arm tip end 67 extends in a direction different from a direction in which the second arm base end 66 extends.

The second arm base end 66 is arranged on the same plane as the second central part 61. The extending direction of the second arm base end 66 may make a prescribed angle with the radial direction of the second central part 61 (namely, the extending direction of the second arm base end 66 may be inclined to the radial direction of the second central part 61) when viewed in the direction along the axis X1 of the drive disk 4. The second arm base end 66 is formed in a flat plate shape. The second arm base end 66 includes a first surface 66A arranged on the same plane as the first surface 61A of the second central part 61 and a second surface 66B arranged on the same plane as the second surface 61B of the second central part 61.

A bent part 68 which extends linearly is formed at the boundary between the second arm tip end 67 and the second arm base end 66. At the bent part 68, the second arm tip end 67 is bent from the second arm base end 66 in the first direction such that an obtuse angle is formed between the second arm base end 66 and the second arm tip end 67.

The second arm tip end 67 extends inward in the radial direction of the drive disk 4 from a tip end of the second arm base end 66. Further, when viewed from the side of the first surface 61A of the second central part 61, the second arm tip end 67 extends from the second arm base end 66 in the counterclockwise direction around the axis X1 of the drive disk 4.

The second arm tip end 67 is formed in a flat plate shape. A first surface 67A of the second arm tip end 67 faces toward the first direction and toward one side in the circumferential direction around the axis X1 of the drive disk 4. A second surface 67B of the second arm tip end 67 faces toward the second direction and toward the other side in the circumferential direction around the axis X1 of the drive disk 4.

The first surface 67A of the second arm tip end 67 is connected to the first surface 66A of the second arm base end 66 via a curved surface of the bent part 68. Similarly, the second surface 67B of the second arm tip end 67 is connected to the second surface 66B of the second arm base end 66 via a curved surface of the bent part 68. The second arm tip end 67 includes a third side edge 67C and a fourth side edge 67D, which extend in the longitudinal direction of the second arm tip end 67. The third side edge 67C is arranged on a side of the first direction with respect to the fourth side edge 67D.

As shown in FIGS. 4, 12, and 13, in the circumferential direction of the base 20, one of the second arm tip ends 67 is arranged between two first arm tip ends 54 adjacent to each other. Similarly, in the circumferential direction of the base 20, one of the first arm tip ends 54 is arranged between two second arm tip ends 67 adjacent to each other. Namely, the first arm tip ends 54 and the second arm tip ends 67 are arranged alternately in the circumferential direction of the base 20 around the axis X1. Each first arm tip end 54 and each second arm tip end 67 are arranged on one virtual plane perpendicular to the rotational axis of the base 20.

The drive disk 4 includes a plurality of roller receiving parts 69 that receive the roller bodies 44 of the drive rollers 21. Each roller receiving part 69 is defined by the first arm tip end 54 and the second arm tip end 67 adjacent to each other. The roller receiving parts 69 include first roller receiving parts 69A respectively defined by the second surface 54B of the first arm tip end 54 and the second surface 67B of the second arm tip end 67 and second roller receiving parts 69B respectively defined by the first surface 54A of the first arm tip end 54 and the first surface 67A of the second arm tip end 67. The first roller receiving parts 69A and the second roller receiving parts 69B are alternately arranged in the circumferential direction of the base 20. Each roller receiving part 69 opens toward the first direction.

As shown in FIGS. 4 to 7, each first arm part 52 includes a first supporting part 71 and a second supporting part 72. The second supporting part 72 is arranged inside of the first supporting part 71 in the radial direction of the base 20. The first supporting part 71 and the second supporting part 72 are provided in the first arm tip end 54, and the second supporting part 72 is arranged closer to a base end of the first arm tip end 54 than the first supporting part 71.

As shown in FIGS. 4 and 8 to 10, each second arm part 62 includes a third supporting part 73 and a fourth supporting part 74. The fourth supporting part 74 is arranged outside of the third supporting part 73 in the radial direction of the base 20. The third supporting part 73 and the fourth supporting part 74 are provided in the second arm tip end 67, and the fourth supporting part 74 is arranged closer to a base end of the second arm tip end 67 than the third supporting part 73.

As shown in FIGS. 4 and 13, the first end 43A of one of two adjacent drive rollers 21 (namely, two drive rollers 21 adjacent to each other) is supported by the first supporting part 71, and the second end 43B thereof is supported by the third supporting part 73. Further, the first end 43A of the other of the two adjacent drive rollers 21 is supported by the fourth supporting part 74, and the second end 43B thereof is supported by the second supporting part 72. Namely, each first arm part 52 and each second arm part 62 support the first end 43A of one of two adjacent drive rollers 21 and the second end 43B of the other of the two adjacent drive rollers 21.

As shown in FIGS. 4 to 13, the first to fourth supporting parts 71 to 74 may be holes or grooves that receive the shafts 43 of the drive rollers 21. At least one of the first supporting part 71 and the third supporting part 73 may be a groove opening toward the side of the main wheel 5, namely, toward the first direction. Further, at least one of the second supporting part 72 and the fourth supporting part 74 may be a groove opening toward the side of the main wheel 5, namely, toward the first direction. In the present embodiment, the first supporting part 71 and the second supporting part 72 consist of grooves recessed in the first side edge 54C of the first arm tip end 54, and penetrate from the first surface 54A to the second surface 54B of the first arm tip end 54. Further, the third supporting part 73 and the fourth supporting part 74 consist of grooves recessed in the third side edge 67C of the second arm tip end 67, and penetrate from the first surface 67A to the second surface 67B of the second arm tip end 67.

As shown in FIG. 13, the first surface 54A of the first arm tip end 54 and the first surface 67A of the second arm tip end 67 are inclined and opposed to each other. Similarly, the second surface 54B of the first arm tip end 54 and the second surface 67B of the second arm tip end 67 are inclined and opposed to each other. Accordingly, the axis of the first supporting part 71 supporting the first end 43A of any drive roller 21 and the axis of the third supporting part 73 supporting the second end 43B thereof are inclined to each other. Further, the axis of the fourth supporting part 74 supporting the first end 43A of any drive roller 21 and the axis of the second supporting part 72 supporting the second end 43B thereof are inclined to each other.

Figure 11A:
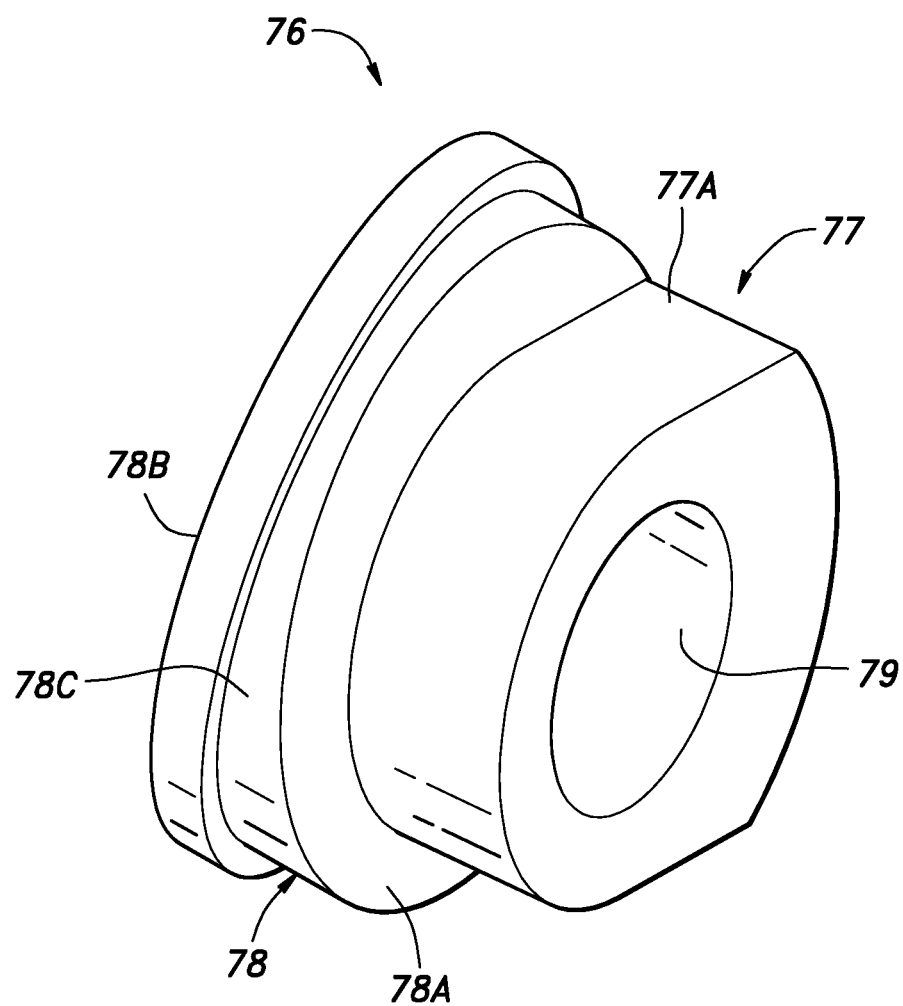
FIG. 11A is a perspective view of a bushing.
Figure 11B:
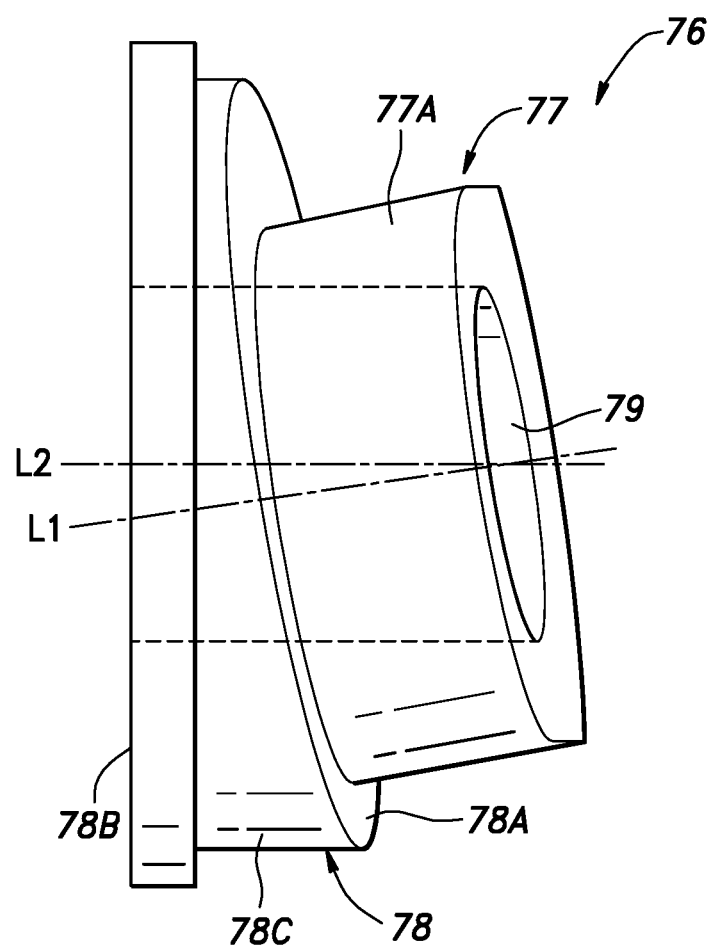
FIG. 11B is a side view of the bushing.

As shown in FIGS. 4 and 14, the first end 43A or the second end 43B of each drive roller 21 is supported by the first to fourth supporting parts 71 to 74 via a bushing 76 for changing an angle of each drive roller 21 with respect to each first arm part 52 or each second arm part 62. As shown in FIGS. 11A, 11B, and 14, the bushing 76 includes an outer circumferential surface 77A coming into contact with at least one of the first to fourth supporting parts 71 to 74 and an inner circumferential surface (an inner hole 79) coming into contact with the first end 43A or the second end 43B of the drive roller 21. An axis L1 of the outer circumferential surface 77A and an axis L2 of the inner circumferential surface (an inner hole 79) are inclined to each other. Further, a distance to the outer circumferential surface 77A from the center (namely, the axis L1) thereof varies in the circumferential direction, and the outer circumferential surface 77A is supported by at least one of the first to fourth supporting parts 71 to 74 such that the outer circumferential surface 77A is not rotatable. Namely, the bushing 76 is fitted to at least one of the first to fourth supporting parts 71 to 74 such that the bushing 76 is not rotatable.

In the present embodiment, the bushing 76 is attached to the first end 43A of each drive roller 21, and is supported by the first supporting part 71 or the fourth supporting part 74. The bushing 76 includes a first part 77 and a second part 78 which is provided at the end of the first part 77. Inside the first part 77 and the second part 78, the inner hole 79 with a circular cross section is formed so as to linearly penetrate each of the first part 77 and the second part 78. The inner circumferential surface of the bushing 76 is formed by a wall surface of the inner hole 79.

The second part 78 has a larger width than the first part 77 in the direction substantially perpendicular to the inner hole 79. The second part 78 has an end surface 78A on a side of the first part 77, and the end surface 78A is formed on a plane perpendicular to the outer circumferential surface 77A of the first part 77. The second part 78 has an end surface 78B on a side opposite to the first part 77, and the end surface 78B is formed on a plane perpendicular to the inner hole 79. The outer circumferential surface 78C of the second part 78 may be formed on a circumferential surface located coaxially with the inner hole 79. The radius of the outer circumferential surface 77A of the first part 77 varies in the circumferential direction. The outer circumferential surface 77A of the first part 77 may be formed, for example, by combining a semi-cylindrical part and a parallelepiped part. The sides of the parallelepiped part may have the same length as the diameter of the semi-cylindrical part. The straight line perpendicular to the end surface 78A of the second part 78 and the axis of the inner hole 79 are inclined to each other.

The outer circumferential surface 77A of the first part 77 is fitted to the first supporting part 71 (groove) or the fourth supporting part 74 (groove) such that the outer circumferential surface 77A is not rotatable. At this time, the second part 78 cannot be fitted to the first supporting part 71 and the fourth supporting part 74. The end surface 78A of the second part 78 comes into contact with the second surface 54B of the first arm tip end 54 or the first surface 67A of the second arm tip end 67, thereby suppressing the movement of the bushing 76 in the axial direction of the first supporting part 71 or the fourth supporting part 74. The end surface 78A of the second part 78 may be arranged parallel to the second surface 54B of the first arm tip end 54 or the first surface 67A of the second arm tip end 67, and may come into surface contact therewith.

In the following, a method for attaching the drive roller 21 to the base 20 will be described. First, the operator inserts the first end 43A of the drive roller 21 into the inner hole 79 of the bushing 76. At this time, the operator inserts the first end 43A into the inner hole 79 from the side of the end surface 78B of the second part 78.

When placing the drive roller 21 in the first roller receiving part 69A, the operator inserts the bushing 76 into the first supporting part 71, and also inserts the second end 43B into the third supporting part 73. Accordingly, the end surface 78A of the bushing 76 is opposed to the second surface 54B of the first arm tip end 54. The axis of the inner hole 79 of the bushing 76 supported by the first supporting part 71 is inclined to the axis of the first supporting part 71, and coincides with the axis of the third supporting part 73. Accordingly, the axis of the drive roller 21 coincides with the axis of the inner hole 79 of the bushing 76 supported by the first supporting part 71 and the axis of the third supporting part 73.

When placing the drive roller 21 in the second roller receiving part 69B, the operator inserts the bushing 76 into the fourth supporting part 74, and inserts the second end 43B into the second supporting part 72. Accordingly, the end surface 78A of the bushing 76 is opposed to the first surface 67A of the second arm tip end 67. The axis of the inner hole 79 of the bushing 76 supported by the fourth supporting part 74 is inclined to the axis of the fourth supporting part 74, and coincides with the axis of the second supporting part 72. Accordingly, the axis of the drive roller 21 coincides with the axis of the inner hole 79 of the bushing 76 supported by the fourth supporting part 74 and the axis of the second supporting part 72.

In the drive disk 4 according to the present embodiment, the main part of the base 20, which rotatably supports the drive rollers 21, can be formed by the first sheet metal member 47 and the second sheet metal member 48, so that the drive disk 4 can be manufactured easily. Each first arm part 52 and each second arm part 62 support the first end 43A of one of two adjacent drive rollers 21 and the second end 43B of the other of the two adjacent drive rollers 21. Accordingly, the drive rollers 21 can be arranged with great spatial efficiency. More specifically, a plurality of first arm parts 52 and a plurality of second arm parts 62 are alternately arranged in the circumferential direction of the drive disk 4, one first arm part 52 includes the first supporting part 71 and the second supporting part 72, and one second arm part 62 includes the third supporting part 73 and the fourth supporting part 74. Accordingly, the drive rollers 21 can be arranged with great spatial efficiency.

The bushing 76 provided with the inner hole 79 inclined to the outer circumferential surface 77A is attached to the first end 43A (one end) of the drive roller 21. Accordingly, the first supporting part 71 and the second supporting part 72 of each first arm part 52 can be arranged on the same plane. Namely, it is not necessary to incline the first supporting part 71 and the second supporting part 72 to each other. Similarly, the third supporting part 73 and the fourth supporting part 74 of each second arm part 62 can be arranged on the same plane. Accordingly, it is not necessary to incline the third supporting part 73 and the fourth supporting part 74 to each other. Thus, the first arm part 52 and the second arm part 62 can be formed easily.

Since the first to fourth supporting parts 71 to 74 consist of grooves, the attachment operation of each drive roller 21 can be facilitated. In a state where the drive disk 4 and the main wheel 5 are combined, the main wheel 5 pushes each drive roller 21 in the second direction. Accordingly, a state where each drive roller 21 is supported by the first to fourth supporting parts 71 to 74 can be maintained.

Figure 15:
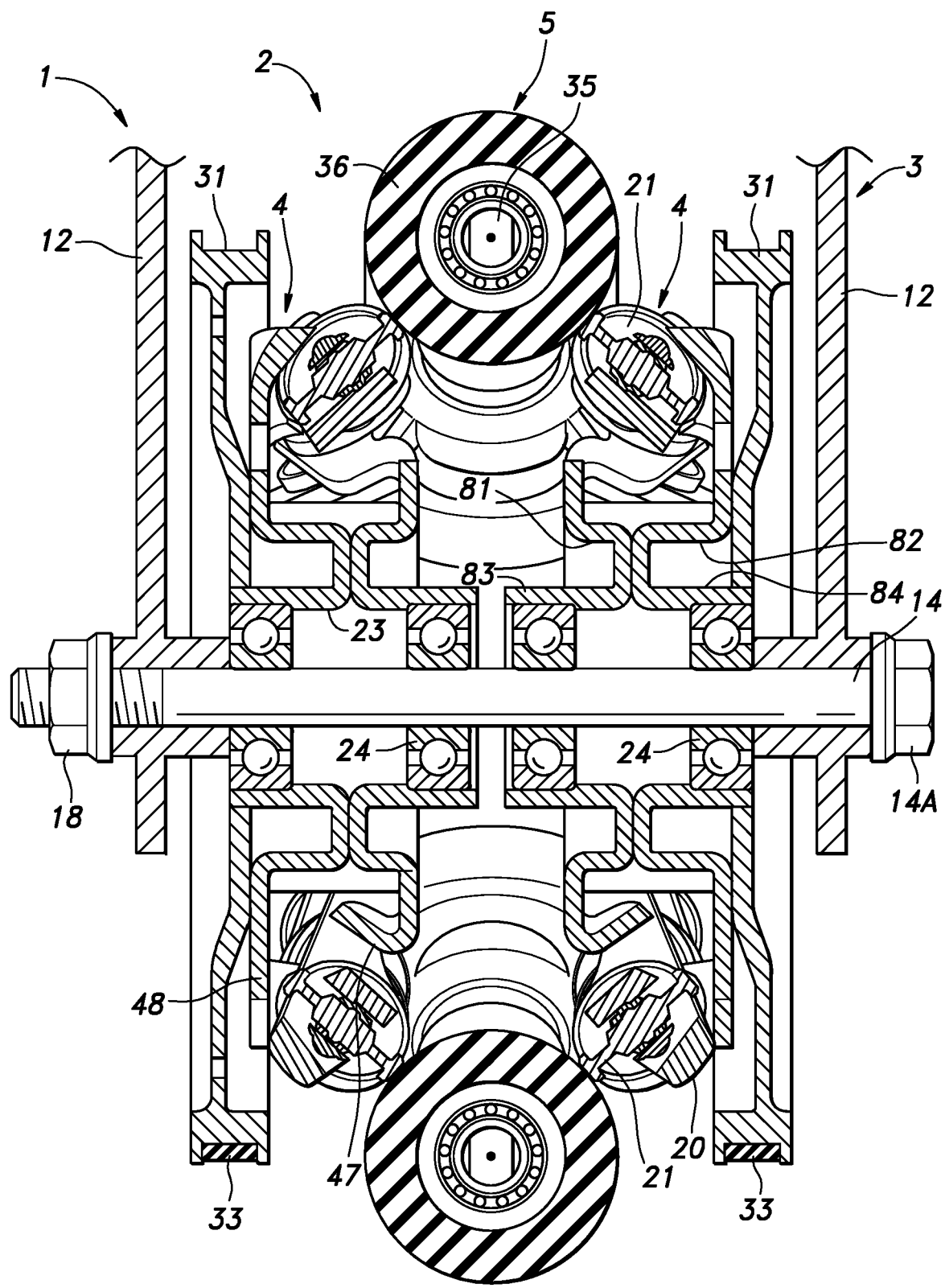
FIG. 15 is a sectional view of a frictional drive unit including drive disks according to a modified embodiment.

Concrete embodiments of the present invention have been described in the foregoing, but the present invention should not be limited by the foregoing embodiments and various modifications and alterations are possible within the scope of the present invention. For example, with regard to the base 20, the spacer 26 interposed between the first sheet metal member 47 and the second sheet metal member 48 may be omitted. In such a case, as shown in FIG. 15, the first sheet metal member 47 and the second sheet metal member 48 may come into direct contact with each other. For example, the first central part 51 of the first sheet metal member 47 may be provided with a first contact part 81 protruding in the second direction and the second central part 61 of the second sheet metal member 48 may be provided with a second contact part 82 protruding in the first direction. The first contact part 81 and the second contact part 82 come into contact with each other in the direction along the axis X1 of the drive disk 4, so that the relative positions of the first sheet metal member 47 and the second sheet metal member 48 are fixed. The first contact part 81 and the second contact part 82 may be fastened to each other by the bolts 64 and nuts 65. Further, a cylindrical first boss 83 extending in the first direction may be provided in the center of the first contact part 81, and a cylindrical second boss 84 extending in the second direction may be provided in the center of the second contact part 82. The bearing hole 23 may consist of inner holes of the first boss 83 and the second boss 84.

The second end 43B of each drive roller 21 may be supported by the second supporting part 72 and the third supporting part 73 via a cylindrical bushing, and the inner circumferential surface of the bushing and the outer circumferential surface thereof may be formed coaxially.

The bushing 76 may be attached to the second end 43B instead of the first end 43A. Namely, each drive roller 21 may be arranged coaxially with the first supporting part 71 and inclined to the third supporting part 73 by using the bushing 76. Similarly, each drive roller 21 may be arranged coaxially with the fourth supporting part 74 and inclined to the second supporting part 72 by using the bushing 76.

The invention claimed is:

1. Drive disks arranged on either side of an annular main wheel and configured to rotate the main wheel around a central axis and an annular axis by applying a frictional force to the main wheel, each of the drive disks comprising:
- a disk-shaped base rotatably supported by a frame; and
- a plurality of rollers rotatably supported by an outer circumferential part of the base, inclined to each other, and coming into contact with the main wheel, wherein the base includes a first sheet metal member and a second sheet metal member, the first sheet metal member includes a first central part and a plurality of first arm parts extending radially outward from the first central part, the second sheet metal member includes a second central part and a plurality of second arm parts extending radially outward from the second central part, the first central part and the second central part are arranged coaxially with each other, each of the rollers has a first end and a second end in an axial direction thereof, each of the first arm parts and each of the second arm parts support the first end of one of two rollers adjacent to each other and the second end of the other of the two rollers adjacent to each other.

2. The drive disks according to claim 1, wherein in a circumferential direction of the base, a tip end of each of the second arm parts is arranged between tip ends of two first arm parts adjacent to each other.

3. The drive disks according to claim 2, wherein the tip end of each of the first arm parts and the tip end of each of the second arm parts are arranged on one virtual plane perpendicular to a rotational axis of the base.

4. The drive disks according to claim 3, wherein the tip end of each of the first arm parts extends outward in a radial direction of the base, and the tip end of each of the second arm parts extends inward in the radial direction of the base.

5. The drive disks according to claim 1, wherein each of the first arm parts includes a first supporting part and a second supporting part arranged inside of the first supporting part in a radial direction of the base, each of the second arm parts includes a third supporting part and a fourth supporting part arranged outside of the third supporting part in the radial direction of the base, the first end of the one of the two rollers adjacent to each other is supported by the first supporting part and the second end thereof is supported by the third supporting part, and the first end of the other of the two rollers adjacent to each other is supported by the fourth supporting part and the second end thereof is supported by the second supporting part.

6. The drive disks according to claim 5, wherein the first end or the second end of each of the rollers is supported by at least one of the first to fourth supporting parts via a bushing for changing an angle of each of the rollers with respect to each of the first arm parts or each of the second arm parts.

7. The drive disks according to claim 6, wherein the bushing has an outer circumferential surface coming into contact with the at least one of the first to fourth supporting parts and an inner circumferential surface coming into contact with the first end or the second end of each of the rollers, and an axis of the outer circumferential surface and an axis of the inner circumferential surface are inclined to each other.

8. The drive disks according to claim 7, wherein a distance to the outer circumferential surface from a center thereof varies in a circumferential direction, and the outer circumferential surface is supported by the at least one of the first to fourth supporting parts such that the outer circumferential surface is not rotatable.

9. The drive disks according to claim 5, wherein at least one of the first supporting part and the third supporting part is a groove opening toward a side of the main wheel, and at least one of the second supporting part and the fourth supporting part is a groove opening toward a side of the main wheel.

* * * * *